United States Patent [19]

Courier de Mere

[11] 4,322,789

[45] Mar. 30, 1982

[54] STATIC CONVERTER OF SYMMETRICAL TYPE

[75] Inventor: Henri Courier de Mere, Paris, France

[73] Assignee: Mere, Malleray & Cie, Mettray, France

[21] Appl. No.: 163,383

[22] Filed: Jun. 26, 1980

[30] Foreign Application Priority Data

Jun. 29, 1979 [FR] France ............................ 79 16911
Jul. 19, 1979 [FR] France ............................ 79 18661

[51] Int. Cl.³ ........................................... H02M 7/537
[52] U.S. Cl. ................................... 363/133; 363/22; 363/56; 315/219; 331/113 A
[58] Field of Search ............... 363/22, 23, 56, 97–98, 363/131, 133; 315/105, 106, 219, 224, DIG. 5, DIG. 7; 331/113 A, 114, 148, 149

[56] References Cited

U.S. PATENT DOCUMENTS

| | | | |
|---|---|---|---|
| 3,350,661 | 10/1967 | Bloom et al. | 363/131 X |
| 3,818,312 | 6/1974 | Luursema et al. | 363/133 |
| 3,927,363 | 12/1975 | Mitchell et al. | 363/56 |
| 4,109,307 | 8/1978 | Knoll | 331/113 A |
| 4,127,893 | 11/1978 | Goepel | 331/113 A |
| 4,188,660 | 2/1980 | Knoll | 363/97 X |

*Primary Examiner*—William M. Shoop
*Assistant Examiner*—Peter S. Wong
*Attorney, Agent, or Firm*—Young & Thompson

[57] ABSTRACT

The invention relates to static converters of the symmetrical type whose function is to convert an input direct current voltage into an output alternating current voltage of chosen frequency and power. The self-oscillator according to the invention is composed of two transistors mounted with a common emitter. The device is energized, for instance, from a main power supply unit, associated with a voltage limiter circuit, which subjects the output power of the device to any parameter. The capacitive power factor of the device is compensated by an inductance connected in series with the main power supply. The device according to the invention can replace, advantageously, the conventional "ballast" for fluorescent lamps.

11 Claims, 4 Drawing Figures

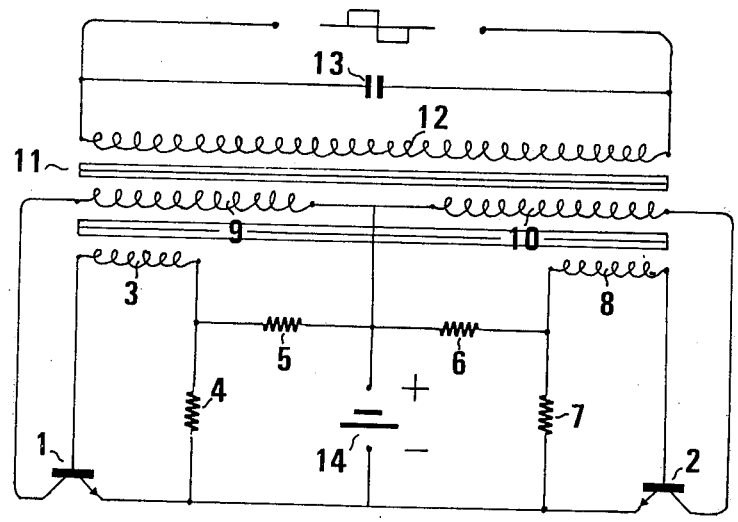
FIG 1
PRIOR ART
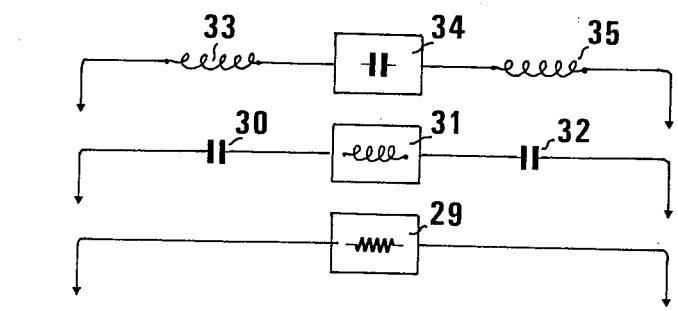
FIG 2
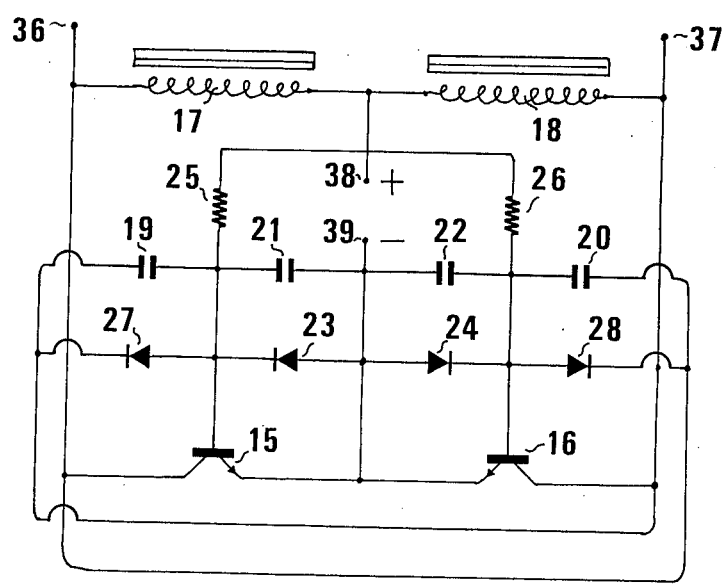

STATIC CONVERTER OF SYMMETRICAL TYPE

BACKGROUND OF THE INVENTION

The invention relates to static converters of the symmetrical self-oscillator type, whose function is to convert a d.c. into an a.c. of chosen frequency and power. In devices of this type, such as the one shown in FIG. 1, the self-oscillator is composed of two switching transistors 1 and 2, mounted with a common emitter. The collector circuit of each of these transistors is connected to the transformer 11 by means of the windings 9 and 10. These two windings, connected to one of the poles of power supply 14, are crossed, successively, by a current of opposite polarity. Secondary windings 3 and 8, inserted into the base-emitter circuits of the transistors, maintain the oscillations. The function of resistors 4 and 7 is to limit the base-emitter current of the transistors. The second function of the resistors 4, 7, respectively, connected to resistors 5 and 6, is to set a divider bridge for biasing correctly the base-emitter circuit of the transistors. Transformer 11 includes a secondary winding 12 which, connected to capacitor 13, constitutes a parallel self-oscillating circuit which determines the frequency of the device. At the terminals of this self-oscillating circuit, the desired a.c. is available. Such a converter allows, from a battery, provides different functions: supplying one unit normally energized from the main power supply, supplying a high voltage, and supplying a current of high frequency.

Such a converter is afflicted with major disadvantages, as set forth below.

Technical disadvantage: in the switching mode, the transistors must, without breakdown, sustain transient surges, which in the blocking state, can easily reach up to five times the voltage of the power supply itself. Thus, for instance, if we consider the rectified main a.c. voltage as the power supply, we dispose of at least 300 v. and consequently, of transitory surges which could reach up to 1,500 v. which is the maximum Vcbo of the best high voltage transistors. Now, by definition, to sustain the Vcbo, we must short-circuit, in the blocking state, the base-emitter path of the transistors. In the aforementioned device, the eventuality of short-circuiting is impossible, because, in case of transient surges of high frequency, the impedance of base windings 3 and 8 is high, this disadvantage is increased by the addition of the supplementary impedance of resistors 4 and 7. Consequently, such an embodiment can only permit the transistors to sustain transient surges which are of very low Vcbo. So, the large field of application that represents the use of the modified main power supply (110 v. 60 Hz or 220 v. 50 Hz) as a d.c. generator, is under those conditions, unavailable, because the expected reliability would be too reduced.

Industrial disadvantage: the fabrication of the transformer of the device implies strict tolerances of manufacturing, because a perfect symmetry of the self-inductance, serial resistor and self-capacity of the four windings must be guaranteed. In addition, such a transformer has ten terminals to be connected in a precise order and this operation increases the difficulty of its industrial fabrication.

Functional disadvantage: the current that this device produces is not perfectly sinusoidal, which makes it unable to energize, for instance, fluorescents lamps. In this application, indeed, if current alternations are not strictly equal in energy, a migration of mercury to one of the ends of the tube may occur. After a short period of operation, this phenomenon results in the blackening of this end. This blackening cannot happen in the case of a direct supply from the power supply, because its sinusoid is perfect; on the other hand, in such devices, even of the best manufacturing quality, the energy of each current alternation is not always perfectly equal. For this reason, such devices have never been manufactured on a large scale, except to supply emergency appliances.

BRIEF SUMMARY OF THE INVENTION

The symmetrical self-oscillator, according to the invention, nullifies these disadvantages. It functions without risks, even using the rectified current of a 220 v. or 380 v. power supply; moreover, it allows industrial manufacturing which can be performed automatically by standard components; finally it provides as output a strictly sinusoidal current, which does not reduce its field of application.

The self-oscillator, according to the invention, is composed of two symmetrical switching means, especially transistors, of which one electrode of each is common and connected to the chosen pole of a d.c. generator. The output electrode of each of these switching means is connected to the other pole of the generator by means of a storage impedance. The control electrode of each of these switching means is connected by a reactive impedance to the output electrode of the opposite switching means. Between each common electrode and each control electrode, an adaptive impedance is connected. Finally, a biasing impedance is connected to each control electrode at a voltage similar to that of the output electrodes. The storage impedance is preferably an inductance; the reactive impedance and adaptive impedance are preferably capacitors; the biasing impedance is preferably a resistor. If the switching means present an opposition of phase between their input and output voltages and if the input of one of them is connected to the output of the other, these switching means became alternatively on and off. The frequency of the periodical current thus created, depends on the self-oscillating circuit composed of the abovementioned series of inductances on the one hand, and composed of the abovementioned series of capacitances on the other hand, both of these series having a common connection with one of the poles of the generator. So, it is possible thereby, to use directly the a.c. between these output electrodes, whether the core of the two inductances is the same or not. In case of a common magnetic core, a third inductance may be wound and at its terminals, it may be possible to connect all types of resistive or reactive loads. In general, if a resistive load is directly connected between the output electrodes without modifying the frequency of the device, it will be different if the load has a reactive factor. So, if this load is inductive, its effects might be compensated by one or more capacitances in serie with it. On the other hand, if this load is capacitive, its effects might be compensated by one or more inductances in serie with it. The parallel compensation of the load is possible, but it reduces also the total impedance of this load and this phenomenon is not desired, especially at the starting of the oscillator.

BRIEF DESCRIPTION OF THE FIGURES

FIG. 1 is a schematic diagram of a static converter of the prior art; and

FIGS. 2-4 are schematic diagrams of different embodiments of a static converter according to the present invention.

DETAILED DESCRIPTION

Figure 3:
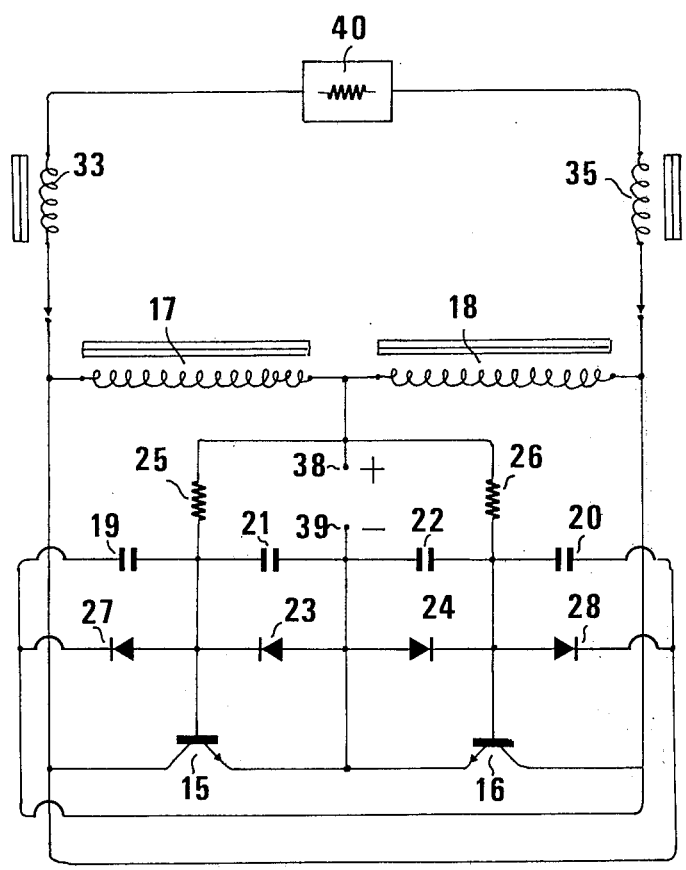

According to a first embodiment, the device of this invention is represented in FIG. 2. The switching means appear there again, especially transistors 15 and 16, inductances 17 and 18, capacitors of adaptation 19 and 20, capacitors of 21 and 22 and bias resistors 25 and 26. The functioning of this first embodiment is the same as above. The parallel oscillating circuit is constituted of the serie of inductances 17 and 18 and constituted of the series of capacitors 19, 20, 21 and 22. These capacitors act as a capacitive divider, whose purpose is to adapt the base-collector impedance of transistors 15 and 16, according to their respective inductances 17 and 18; it proceeds in fact as if a base intermediary connection had been set on one of these inductances. The function of diodes 23 and 24 is to establish the free running of the a.c. at the terminals of capacitors 21 and 22, because, at this point, the base-emitter path of the transistors 15 and 16 acts as a single diode. Besides, diodes 23 and 24 have another function: to protect the base of transistors 15 and 16 from all types of inverse surges. Diodes 27 and 28 are optional, but they can, in some cases, have the same function as the other diodes and protect these transistors in an effective way. The output energy is available between terminals 36 and 37. It can be directly applied in case of resistive load; in case of inductive load, it can be applied through capacitors 30 and 32; in case of capacitive load, it can be applied through inductances 33 and 35; the input d.c. is applied between the terminals 38 and 39. In the aforementioned device, the input voltage can nearly be as high as the Vcbo of the transistors. Indeed, contrary to the known device represented in FIG. 1, the device according to the invention allows the establishment at the blocking state of the transistors a really perfect short-circuit between the base and the emitter, because, in fact, for the transitory surges of high frequency, capacitors 21 and 22 oppose a minor impedance, greatly inferior to the input impedance of the transistors. Consequently, it is possible to use the maximum sustaining characteristics of the transistors. On the other hand, as inductances 17 and 18 can be wound on independant cores, the manufacture and the mounting thereof are greatly simplified. Besides, the associated components are very common and can be automatically inserted. Resistors 25 and 26 have to assume a temporary biasing function, because, the device according to this embodiment of the invention acts as a blocking oscillator, which, after starting, can operate without this biasing.

Finally, the available current between output terminals 36 and 37 is perfectly sinusoidal.

According to a second embodiment of the invention, represented in FIG. 3, the device may appear similar to the first described embodiment. It is, nevertheless, different in its functional manner. Indeed, in this case, a load 40 may advantageously act as a negative resistor and the frequency of the oscillator is essentially governed by the characteristics of this negative resistor, of the inductances 33 and 35 in series and of capacitors 19, 20, 21 and 22 in serie. In this case, inductances 17 and 18 do not interfere in the setting of the resonant frequency, they act as mere choke coils that separate the d.c. circuit from the a.c. circuit. This embodiment is particularly adapted to the supplying of fluorescent lamps.

The peculiar advantage of this embodiment of the invention is to make the load active during the resonance process, if it presents convenient characteristics. Under these conditions, the load, for instance, a fluorescent lamp, is not only a passive load but a dynamic load inserted into a circuit which complies which its intrinsic characteristics. Consequently, a load is thus connected in the optimum manner to the associated generator, which affords a total electric efficiency of high level.

Figure 4:
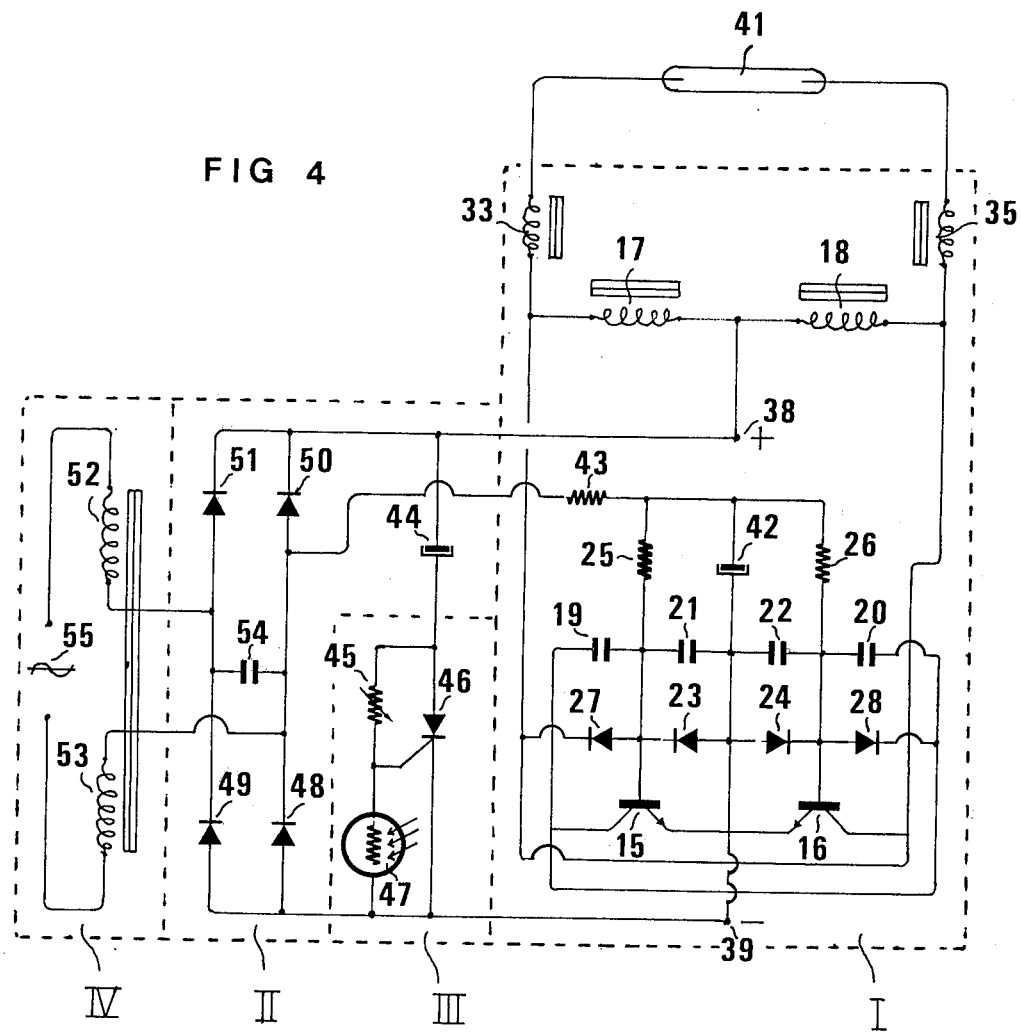

According to a third embodiment of the invention, represented in FIG. 4, the device is used to solve a very hard problem: energizing a fluorescent lamp directly from a main power supply, with a reliability, a cost price, and an efficiency comparable to a known device. The means used to reach this result are composed of four subcircuits I, II, III and IV. The proper inverter circuit I is according to the previous embodiments of the device of the invention. Indeed, the same components are used: transistors 15 and 16, diodes 23, 24, 27 and 28, capacitors 19, 20, 21 and 22, coils 17, 18, 33 and 35 and resistors 25 and 26. We must, moreover, notice the presence of the storage capacitor 42 and the presence of the connected resistor 43. These supplementary components have the function to filter the rectified current by way of diode 48, so that the alternative component of the mains has no sensible effects on the biasing current of transistors 15 and 16. The fluorescent lamp 41 can be composed of cold cathodes, because the output voltage developed by the device is largely sufficient to start such a lamp, without heating and without a starter.

The supplying d.c. terminals 38 and 39 are connected to the main power supply unit II, which includes a rectifier bridge composed of four diodes 48, 49, 50 and 51 and composed of a filtering capacitor 44.

As shown, the power supply unit II can be mounted with a voltage reducer circuit III. The purpose of this circuit is to reduce the voltage until the extinction of the emitted light of the fluorescent lamp 41, in correlation with any parameter. Therefore, the voltage reducer circuit III adapts the quantity of light provided by the lamp 41 to the average ambient light, and that, consequently, maintains this ambient light noticeably constant and above all, leads to substantial savings, as compared to conventional devices. This voltage reducer circuit includes a SCR 46 mounted in series with a capacitor 44. The voltage at the ends of this capacitor 44 depends on the angular aperture of phase of this SCR, versus the rectified main current. This phase angle is governed by the voltage divider bridge that commands the gate of the SCR 46, that is to say variable resistor 45 and light dependant resistor 47 having a negative coefficient. Thus, the stronger the ambient light is, the lower the value of the light dependant resistor 47, and thus the lower the cathode gate voltage of the SCR and, consequently, its conduction angle. Under these conditions, the variable resistor 45 determines an adapted average ambient light.

The disadvantage of the device, wherein the converter is energized from the main power supply, with the voltage limiter circuit or without, is that it is hindered by an approximative capacitive power factor of 0.6. If such a device is used in the same installation in competition with non compensated conventional devices, whose power factor is inductive and whose value is approximatively 0.5, these two devices compensate each other; in the opposite case, compensation is to be foreseen. It is the purpose of the compensating circuit IV, which includes inductances 52 and 53 mounted in series and preferably wound on the same magnetic core. The impedance of these inductances is chosen so that the phase displacement it imposes on the current, compensates the capacitive power factor of the device according to the invention. Furthermore, both these inductances have a secondary function: that is, that in conjunction with capacitor 54, they make up a filter that prevents the internal transients from crossing the main power supply.

The reliability of such a device is very high because the transistors dissipate very little energy in switching; moreover, they are used below their maximum voltage characteristics.

The efficiency in lumens per watt of such a device is clearly superior to that of the best conventional devices: which represents a very appreciable saving. The cost of such a compensated device is noticeably less than that of a compensated conventional device. This results to some extent from the fact that the inductances used to set up such a device according to the invention are easy to build and allows a winding and an automatic mounting.

Moreover, such a device reduces in proportion of 1 to 5 the weight of copper used, reduces in proportion of 1 to 25 the weight of the core, reduces in proportion to 1 to 7 the bulk and, finally, reduces in proportion of 1 to 20 the total weight, in comparison with equivalent conventional devices.

The device according to the invention allows rapid starting of the fluorescent lamps without using a starter or supplementary windings to heat the cathodes.

The device according to the invention may be governed by ambient light, which is hard to carry out at a low cost with the conventional devices.

Other interesting applications of the invention are to provide, from a d.c. voltage of low value, a high d.c. or a.c. voltage and this, without a supplementary winding on a transformer with a single magnetic core. Thus, it is possible to provide from this device the high d.c. voltage necessary to supply the capacitive discharge for automobile ignition.

As is obvious and as has already been seen from the foregoing, the invention is not limited to those modes of application and embodiment which have been more particularly described but includes all variations thereof.

Having described the invention, I claim:

1. A static converter for converting a d.c. input into an a.c. output having a desired frequency and power, comprising
a symmetrical oscillator circuit including
   (a) a pair of input terminals (38, 39) adapted for connection with a direct-current source;
   (b) a pair of switching transistors (15, 16) each of which includes base, emitter, and collector electrodes, each of said emitter electrodes being connected with one of said input terminals, said collector electrodes being connected with a pair of output terminals (36, 37), respectively;
   (c) a pair of inductors (17, 18) each connected at one end with the other of said input terminals, the other ends of said inductors being connected with the collector electrodes of said switching transistors, respectively;
   (d) a pair of first capacitors (21, 22) each connected at one end with said one input terminal, the other ends of said first capacitors being connected with the base electrodes of said switching transistors, respectively;
   (e) a pair of second capacitors (19, 20) each connected at one end with the base electrode of one of said switching transistors, respectively, each connected at the other end with the collector electrode of the other of said switching transistors, respectively; and
   (f) a pair of resistors (25, 26) each connected at one end with the other of said input terminals, the other ends of said resistors being connected with the base electrodes of said switching transistors, respectively, whereby when direct current is applied to said input terminals, said oscillator circuit produces an alternating current output at said output terminals having a frequency and power determined by the values of said inductors, said first and second capacitors, and said resistors.

2. A static converter as defined in claim 1, wherein said inductors are wound on a common core, and further comprising a third inductor wound on said common core and connected across said output terminals.

3. A static converter as defined in claim 1, wherein said inductors are wound on independent cores, respectively.

4. A static converter as defined in claim 1, and further comprising a pair of free-running diodes (23, 24), each connected between the base and emitter electrodes of said transistors, respectively.

5. A static converter as defined in claim 1, and further comprising a pair of protection diodes (27, 28) each being connected at one end with said base electrode of one of said switching transistors and at the other end with said collector electrode of the other of said switching transistors.

6. A static converter as defined in claim 1, and further comprising a pair of third capacitors connected with said pair of output terminals, respectively, for symmetrically connecting said output terminals with a load.

7. A static converter as defined in claim 6, wherein the frequency of the alternating current output is further determined by the values of said third capacitors connected with the load, and further wherein said inductors operate to isolate the direct current input from the alternating current output.

8. A static converter as defined in claim 1, wherein the alternating current output is supplied to a diode bridge rectifier circuit (48, 49, 50, 51) the output of which charges a storage capacitor (42).

9. A static converter as defined in claim 1, wherein the direct current source comprises a direct current generator power supply containing a storage capacitor.

10. A static converter as defined in claim 9, and further comprising a limiter circuit connected with said rectifier circuit for limiting the output of said rectifier circuit, said limiter circuit including an SCR (46) connected with a light-responsive resistor (47), the operation of said SCR being controlled by a given light intensity striking said light-responsive resistor.

11. A static converter as defined in claim 10, and further comprising a compensating circuit connected with said rectifier circuit, said compensating circuit including a pair of inductors (52, 53) symmetrically connected with the input terminals of said rectifier circuit, whereby a capacitive power factor of the converter is compensated.

* * * * *